United States Patent Office 3,520,635
Patented July 14, 1970

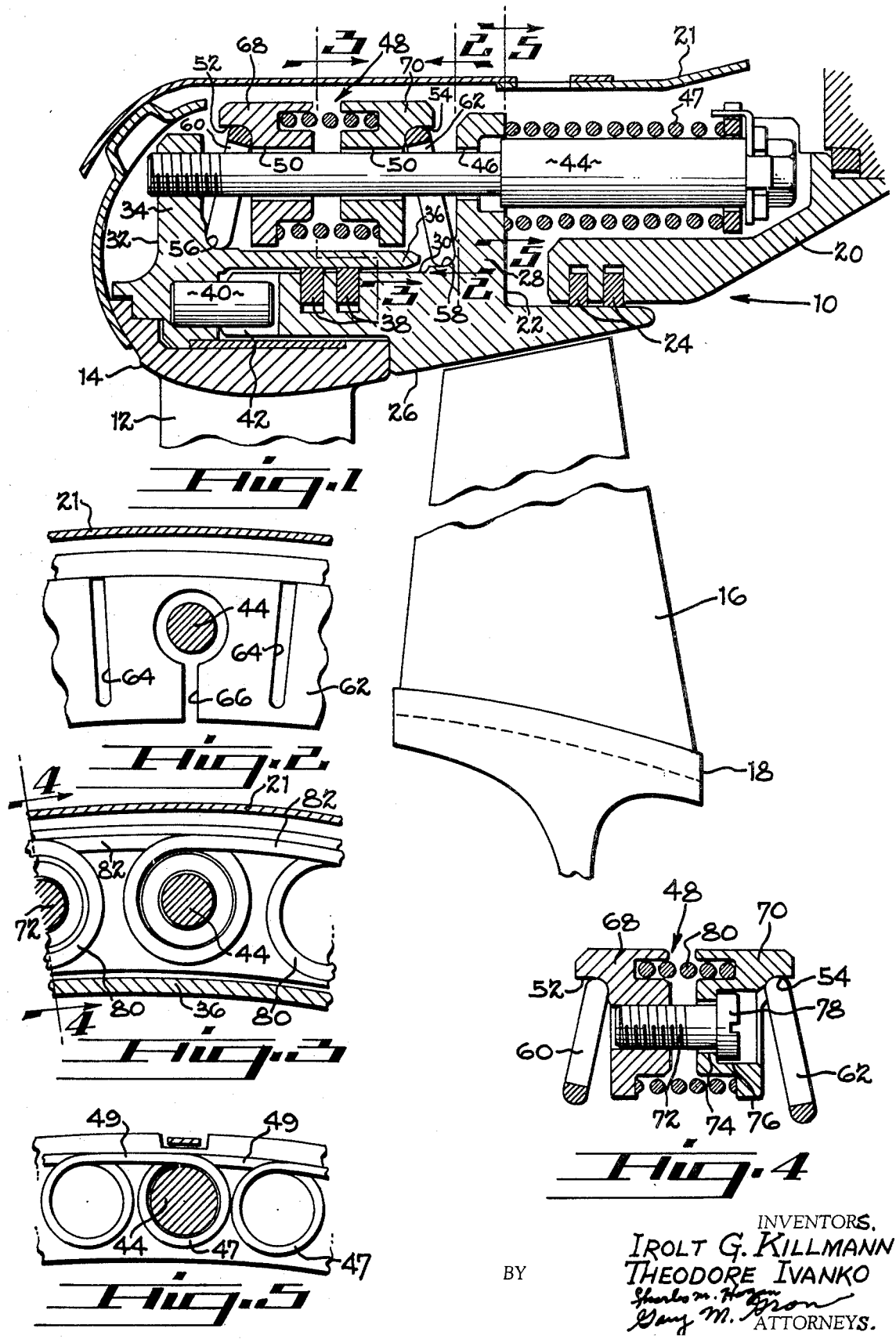

3,520,635
TURBOMACHINE SHROUD ASSEMBLY
Irolt G. Killmann, West Haven, and Theodore Ivanko, Fairfield, Conn., assignors to Avco Corporation, Stratford, Conn., a corporation of Delaware
Filed Nov. 4, 1968, Ser. No. 773,055
Int. Cl. F01d 9/00
U.S. Cl. 415—138                                    10 Claims

ABSTRACT OF THE DISCLOSURE

The disclosure relates to a self-contained shroud assembly for a turbomachine which automatically compensates for temperature expansion to maintain a substantially constant clearance or provide for a desired clearance between the assembly and the outer periphery of a series of turbine or compressor blades with which it is used. Compensation is provided by a pair of rings axially displaceable relative to one another and adapted to have different circumferential expansion in response to temperature increases. A lever, for example a notched Belleville washer, between the two rings translates the differential circumferential expansion into axial movement of one of the rings. The movable ring supports or is part of an inclined shroud which is axially displaceable towards the turbine or compressor blades to maintain the constant clearance.

---

The present invention relates to turbomachines and more specifically to shroud assemblies incorporated therein.

One of the areas of turbomachine design that has received a great deal of emphasis is the shroud assembly used to define the outer bounds of an annular flow path across a series of rotating turbine or compressor blades or buckets. In order to increase the thermodynamic efficiency of the rotating blades, it is necessary to maintain the clearance between the shroud and the blades as small as possible without interference. Generally, this clearance is established at a finite value for an engine in the nonoperating condition. However, when the engine is in operation and relatively hot gases pass across the turbine blades and the shroud, the components experience a rather substantial growth due to their thermal coefficients of expansion and the centrifugal stresses of the rotor assembly. Since during the starting cycle and in transition periods the blades and the rotor grow more rapidly than the shroud assembly, the initially set cold clearance and the finally reached operating clearance are larger than desired for optimum efficiency. That is, the clearance between the components increases in the steady state running condition, after all the components have reached their full temperature, since the shroud is radially outward from the blade and since it normally experiences a greater growth than the blades.

A number of approaches have been tried to minimize the running clearance. A typical example is the provision of an inclined shroud which is axially displaceable towards inclined blade tips to reduce the clearance and compensate for the greater expansion of the shroud. Generally, the shroud is displaced by a rather complicated and expensive external hydromechanical control system which is responsive to temperature.

Accordingly, it is an object of the present invention to provide a self-contained, simplified, thus reliable and inexpensive shroud assembly that automatically compensates for temperature expansion to maintain a substantially constant clearance between the shroud assembly and turbomachine blades with which it is used.

In its broader aspects the present invention comprises a means for forming a shroud around the periphery of a plurality of radially extending blades. The shroud means is adapted to provide a variable clearance between the blades and the shroud means in resposne to relative axial movement. A means for forming a first ring provides a support for the shroud means. A means for forming a second ring adjacent to the first ring is adapted to have a different circumferential expansion in response to temperature increases adjacent the shroud assembly. A lever means acts on the first and second ring means so that their differential circumferential expansion produces a relative axial displacement so that a relatively constant clearance is maintained between the shroud means and the blades irrespective of the temperature adjacent the shroud assembly.

The above and other related objects and features of the present invention will be apparent from a reading of the description of the disclosure shown in the accompanying drawings and the novelty thereof pointed out in the appended claims.

In the drawing:

FIG. 1 is a detailed longitudinal section view of a shroud assembly embodying the present invention, together with the cooperating elements of a turbomachine;

FIG. 2 is a view taken on lines 2—2 of FIG. 1;

FIG. 3 is a view taken on lines 3—3 of FIG. 1;

FIG. 4 is a view taken on lines 4—4 of FIG. 3; and

FIG. 5 is a view taken on lines 5—5 of FIG. 1.

Referring particularly to FIG. 1, there is shown a shroud assembly, generally indicated by reference character 10, for use in a turbomachine. The turbomachine components with which the shroud assembly 10 cooperates include a turbine nozzle comprising a plurality of radial vanes 12 secured to an annular outer support structure 14 and extending inward to an inner support member (not shown). The vanes 12 direct an annular stream of hot motive fluid across a plurality of blades 16 secured to a rotatable hub or wheel 18 which forms a rotor. As stated previously, the shroud assembly 10 defines the outer bounds of the annular flow path across the blades 16 and in accordance with the present invention compensates for the increase in clearance due to thermal expansion.

The shroud assembly comprises a downstream annular support element 20 secured in suitable fashion to the exterior casing 21 of the turbomachine with which the shroud is used. A first ring 22 is positioned adjacent the support member 20 and displaceable relative thereto. A pair of seal elements 24 provide a gas seal between member 20 and ring 22. The ring 22 further comprises a radially extending flange 28 and an axially extending sleeve portion 30 which telescopes over the annular support member 14 for the turbine vanes 12. A second ring 32 has a radially extending flange 34 which is generally in alignment with radial flange 28 of the first ring 22 and has an axially extending sleeve 36 which is telescoped over sleeve 30 of the ring 22. A pair of seal elements 38 are positioned between the sleeve portions 36 and 30.

As herein described, the ring 22 provides a support for an integral annular shroud 26 having an inclined annular surface cooperating with the tips of the blades 16 to form a clearance space. It should be apparent, however, that the ring 22 can also support a separate shroud element.

The rings 22 and 32 are guided for axial movement only relative to one another by a series of pins 40 fixed in ring 32 and extending into notches 42 formed in sleeve 30 of ring 22. The rings 22 and 32 could also be guided by the series of circumferentially spaced shafts 44 threaded into flange 34 and projecting through and beyond holes 46 in flange 28. The free end of shaft 44 is secured in suitable fashion to the support element 20. A spring assembly 47 is positioned around the projected end of each shaft 44 to urge the flanges 28 and 34 toward one another. As shown in FIG. 5, the spring assembly 47 is comprised of a series of coils interconnected by links 49 to form an integral one-piece spring assembly.

A second ring assembly is positioned radially outward from the sleeves 30 and 36 and between the opposed flanges 28 and 34. The ring assembly 48 is guided for movement relative to the ring 22 and 32 by the pins 44 which pass through openings 50. The ring assembly 48 has inwardly facing shoulders 52 and 54 on opposite radial faces. Corresponding outwardly facing shoulders 56 and 58 are formed at the base of the opposed flanges 34 and 28, respectively. It should be noted that the axial distance between shoulders 56 and 58 is greater than the distance between the shoulders 52 and 54. A pair of Belleville washers 60 and 62 are positioned between the ring assembly 48 and the rings 32 and 22. The Belleville washers have a series of alternately directed radial notches 64, 66, as shown in FIG. 2, so that the Belleville washers 60 and 62 have substantially no axial stiffness and as a result act as a lever between the ring assembly 48 and the rings 32 and 22.

As shown in FIG. 4, the ring assembly 48 preferably comprises a pair of rings 68 and 70 which form opposite faces of the ring assembly 48. The rings 68 and 70 are guided for relative axial movement by a series of screws 72 threaded into ring 68 and extending through openings 74 in ring 70 to the bottom face of a bore 76. The rings 68 and 70 are yieldably maintained against the cap 78 of the screw 72 by a spring assembly 80 comprised of a series of coils interconnected by links 82 to form an integral one-piece spring assembly as shown in FIG. 4.

In operation, the clearance between the shroud 26 and the tip of the blades 16 is set for static conditions in the usual fashion to provide safe transient operation. When the turbomachine is in operation the temperature adjacent the shroud assembly 10 increases. Since the ring 22 is closely adjacent to the hot fluid flowing across blade 16, it experiences a substantial degree of circumferential thermal expansion. The same phenomena holds true for ring 32 which is in direct contact with support member 14 for the turbine vanes 12. However, the ring assembly 48 is isolated from the gas stream by the rings 22 and 32. As a result, its temperature increase is less and its circumferential thermal expansion is substantially less. The net result is that the shoulders 52 and 54 and the shoulders 56 and 58 radially displace relative to one another. This relative radial displacement is translated into axial movement of ring 22 by the lever system formed by washers 60 and 62. The net result is that the shroud 26, in response to increased temperature adjacent the shroud assembly, is displaced axially towards the tip of the turbine blades 16 to compensate for expansion of shroud 26 and maintains a substantially constant clearance irrespective of the temperature changes adjacent the shroud assembly. It should be apparent that the particular design of the rings and the lever system will depend upon the thermal expansion characteristics of the turbomachine with which it is used. Any desired relationship between the axial displacement and the radial growth of the shroud 26 can be produced by selecting the proper initial angles of the levers 60 and 62.

It should be noted that since lever systems are provided on both sides of the ring assembly 48 the axial movement for a given relative circumferential expansion is maximized. Since the ring assembly 48 is split and held in an expanded fixed position by spring 80, it acts as a unitary ring for most operating conditions. However, in order to present physical interference between the shroud 26 and the blades 16 in case of a malfunction in the turbomachine, a mechanical stop and override feature is incorporated in the design of the mechanism. A positive stop is provided at the flange 28, when the bottom of the hole 74 touches the face 75 of the bolts 44. The exact location of this stop is adjustable by turning the bolts 44. After this stop has been reached, further temperature expansion of the shrouds 26 and 14 would create excessive forces in the parts of the assembly. Thus the spring 80 will yield in response to the resultant axial force on the ring 22 to minimize the stresses.

The unitary nature of the spring assemblies 47 and 80 enables a greatly simplified method of assembly since the coils are pre-aligned with the pins over which they are telescoped.

While the preferred embodiment of the present invention has been described, it will be apparent to those skilled in the art that modifications can be performed without departing from its spirit. Accordingly, the scope of the invention is to be determined solely by the appended claims.

Having thus described the invention, what is novel and desired to be secured by Letters Patent of the United States is:

1. A shroud assembly for a turbomachine rotor including a hub and a plurality of radially extending blades, said shroud assembly comprising:
   means for forming a shroud around the periphery of said blades, said shroud means being adapted to provide a variable clearance between said blades and said shroud means in response to relative axial movement;
   means for forming a first ring, said first ring means forming a support for said shroud means;
   means for forming a second ring adjacent said first ring, said first and second ring means being adapted to have different circumferential expansion in response to increases in temperature adjacent the shroud assembly;
   lever means acting on said first and second ring means so that their differential circumferential expansion produces a relative axial displacement therebetween, said second ring means being supported relative to said rotor so that a relatively constant clearance is maintained between said shroud means and said blades irrespective of the temperature adjacent said shroud assembly.

2. A shroud assembly as in claim 1 wherein said second ring means has a smaller circumferential expansion than said first ring means.

3. A shroud assembly as in claim 2 wherein said first ring means is closely adjacent a relatively hot stream of fluid passing across said blades and said second ring means is exterior of said first ring means, thereby having a lower heat input than said first ring means and having a lower circumferential expansion.

4. A shroud assembly as in claim 1 wherein:
   said first ring means comprises a pair of rings displaceable relative to one another, one of said rings being fixed relative to said rotor and the other supporting said shroud means;
   said second ring means is positioned between said fixed and said shroud-supporting rings;
   said lever means comprises a pair of lever means acting on opposite sides of said second ring means and acting against each of said rings whereby the axial displacement of said shroud-supporting ring in response to temperature change is maximized.

5. A shroud assembly as in claim 4 wherein said fixed and said shroud-supporting rings comprise:
   opposed radially extending flanges and axially extending sleeve portions telescoped into one another to form the inner periphery of an annular space between the opposed faces;
   said second ring means is positioned in said annular space between said opposed faces whereby the circumferential expansion of said second ring is lower than the expansion of said fixed and said shroud-supporting ring in response to temperature increases adjacent said shroud assembly.

6. Apparatus as in claim 5 wherein:
said second ring means has inwardly facing shoulders around its outer periphery on opposite sides and said fixed and said shroud-supporting rings form outwardly facing shoulders at the inner portion of the opposed flanges;
the distance between said outwardly facing shoulders being greater than the distance between said inwardly facing shoulders;
said pair of lever means is adapted to act against the inwardly facing shoulders on said second ring means and the outwardly facing shoulders on said fixed and said shroud-supporting rings;
said shroud assembly further comprises spring means for yieldably urging said fixed and said shroud-supporting means towards one another thereby to maintain said lever means in engagement with said shoulders.

7. A shroud assembly as in claim 6 wherein said lever means comprises:
a pair of Belleville-type washers positioned so that the outer periphery of the washers abut the inwardly facing shoulders on said second ring means and the inner periphery of said washers, respectively abut the outwardly facing shoulders on said fixed and said shroud-supporting means;
each of said Belleville washers having a plurality of alternate inwardly and outwardly facing radial slots around its periphery for substantially minimizing the inherent axial stiffness of said washers.

8. A shroud assembly as in claim 7 wherein:
said fixed ring means, said second ring means and said shroud-supporting means are guided for relative axial movement by shafts secured to said fixed ring and extending through aligned openings in said second ring means and said shroud-supporting ring and projecting beyond said shroud-supporting ring;
said spring means comprises a plurality of integral interconnected coiled springs positioned around the projected portion of said shafts and each having one end acting against said shroud-supporting means and the other end support by the free end of said shafts.

9. A shroud assembly as in claim 4 wherein:
said shroud-supporting means and said shroud-forming means are formed from a unitary ring having an inwardly facing annular surface positioned adjacent the periphery of said blades, said annular surface and the outer ends of said blades being inclined relative to the axis of said rotor whereby axial movement of said ring in a given direction relative to said blades reduces the clearance therebetween;
said second ring means is split to form a pair of rings axially displaceable relative to one another;
said shroud assembly further comprises means for yieldably urging said above-mentioned rings away from one another and a positive, adjustable stop whereby said second ring means forms a yieldable member in the event of reaching the stop in order to prevent interference between said shroud and said blades and to prevent excessive stresses.

10. A shroud assembly as in claim 9 wherein:
the rings of said second ring means as aligned relative to one another by a plurality of axially extending screws positioned around the periphery of said rings and threaded into one of said rings and extending through the other of said rings so that the head of the screw is on the outer facing side;
said yieldable urging means comprises a series of unitary interconnected coil springs wrapped around each of said screws and acting against the opposed faces of said second ring means to yieldably maintain said rings in a given maximum position.

References Cited
UNITED STATES PATENTS

| | | | |
|---|---|---|---|
| 2,863,634 | 12/1958 | Chamberlin et al. | 253—39.1 |
| 2,962,256 | 11/1960 | Bishop | 253—39 |
| 2,994,472 | 8/1961 | Botje | 253—39 |
| 3,227,418 | 1/1966 | West | 253—78 |

HENRY F. RADUAZO, Primary Examiner